July 12, 1966 J. M. BENTLEY 3,261,012

ANALOG TO DIGITAL CONVERSION SYSTEM

Filed March 22, 1963 2 Sheets-Sheet 1

WITNESSES
Theodore F. Wrobel
James F. Young

INVENTOR
John M. Bentley
BY John L. Viegaffe
ATTORNEY

July 12, 1966 J. M. BENTLEY 3,261,012

ANALOG TO DIGITAL CONVERSION SYSTEM

Filed March 22, 1963 2 Sheets-Sheet 2

United States Patent Office 3,261,012
Patented July 12, 1966

3,261,012
ANALOG TO DIGITAL CONVERSION SYSTEM

John M. Bentley, Glen Burnie, Md., assignor to Westinghouse Electric Corporation, Pittsburgh, Pa., a corporation of Pennsylvania Filed Mar. 22, 1963, Ser. No. 267,165
6 Claims. (Cl. 340—347)

This invention relates to improvements in analog to digital conversion systems.

A primary object of the invention is to provide an improved system of the kind described which will have improved accuracy, sensitivity and signal to noise ratio and will be capable of high speed.

There are numerous ways in which analog values may be converted to digital representation. The speed and accuracy of such systems varies over a wide range because in some instances speed and accuracy can be sacrificed in the interest of reducing costs. In other instances it is essential that the system be capable of very high speed, that is, capable of accepting and processing samples of input data at a very high rate and with a very great accuracy. It is to this type of system that the present invention is directed.

In general, the present invention relates to the type of system in which a pulse generator or oscillator of substantially constant frequency is used for the purpose of measuring the rate of change of some time function, the function being sampled at the oscillator frequency and each analog sample being converted to binary digital representation. Variations of this system are known and the particular one to which the present invention relates is one in which there is a pulse generator supplying counting pulses through steering gates to a counter. This gate steers the counter to count forward or backward to cause the digitized analogue reference voltage to equal the sampled input analog signal. The digital representation of the sample is indicated by the count in the counter.

It will be readily apparent that the accuracy of any such system will be directly dependent upon the speed with which the pulses can be steered.

The sensitivity is dependent upon the speed and accuracy with which the system can follow the rapid excursions of input analog signals and upon the minimum size of the increments of the analog signals which can be distinguished from one another. It is an object of the invention to provide an improved comparator circuit in which the analog of the digital representation generated by the system can be compared with the unknown analog in order to create the appropriate error signal for controlling the action of the counter.

A further object of the invention is to provide an analog-to-digital conversion systems in which there will be minimum variation between the instantaneous value of the sampled input analog and the digital representation.

Any digital transducer, whether it be designed to measure strain, temperature or any other variable parameter, must utilize an analog sensing element which converts the basic parameter to a proportional electrical analog signal. The electrical output of this sensing element must be continually monitored by an encoding device which continuously develops a potential equal, in amplitude and polarity, to that at the output of the sensor. The encoding device must continuously change its binary digital output value to provide a digital number that is at all times as near as possible a true proportional representation of the input voltage.

In order not to load the transducer and therefore not degrade the available information, the input to the analog-to-digital converter must have a very high impedance. To follow rapid excursions of the information at the transducer output it must be extremely fast and in order to maintain accuracy in this environment it must be stable.

It is therefore a further object of the invention to provide an analog-to-digital conversion system accomplishing the objectives mentioned immediately above.

The invention itself, however, both as to its organization and method of operation, as well as additional objects and advantages will best be understood from the following description when read in connection with the accompanying drawings, in which.

The logic of the present analog-to-digital converter is such that with a potential difference between the output of the analog transducer and the output of a weighted resistor network of known arrangement, a voltage comparator enables the counter to count forward or backward until the difference between the two voltages is within the minimum resolution or accuracy of the system. In accordance with the present system an accuracy of approximately plus or minus one millivolt is accomplished. The system maintains this small difference on a continuous basis. As the analog input from the transducers changes the counter will count forward if the unknown analog voltage is greater than the weighted binary digital output of the counter and will count backward if the unknown analog input voltage is less than the weighted network output voltage. As the analog input from the transducer changes by the least significant increment the counter adds or subtracts one increment to effect a null across the voltage comparator. This provides the capability of continuous readout from the transducer system either in parallel or serial operation. A very important feature of the present invention is that this logic allows the converter to follow rapidly changing signals without loss of accuracy.

Figure 1:
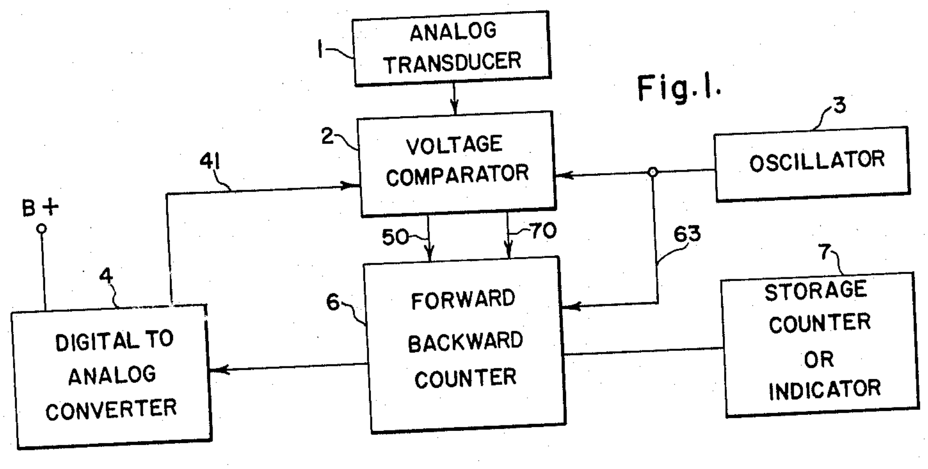
FIGURE 1 is a functional block diagram of an analog-to-digital system in accordance with the present invention.

The basic system briefly discussed above is shown in FIGURE 1 wherein the analog transducer 1 has its output, representing the unknown quantity, supplied to a voltage comparator 2. From the previous discussion it will be apparent that the two voltages compared in this comparator circuit are the outputs from transducer 1, on the one hand, and the output of the weighted resistor electrical summation network of the digital-to-analog converter 4. The output of the voltage comparator 2 is supplied to the forward-backward counter 6.

Any forward-backward counter is merely a register, counter or storage device having a plurality of stages, and in a binary system the outputs of these stages alternate betwen a 1 and 0 state. Such a counter will have two simultaneous outputs, one of which is the complement of the other. The binary digital representation of the output of the analog transducer 1 may be read into a digital storage counter or indicator 7 from the counter 6 while at the same time the complementary output of the forward-backward counter is supplied to the digital-to-analog converter 4, the details of which are shown in FIG. 2.

Figure 2:
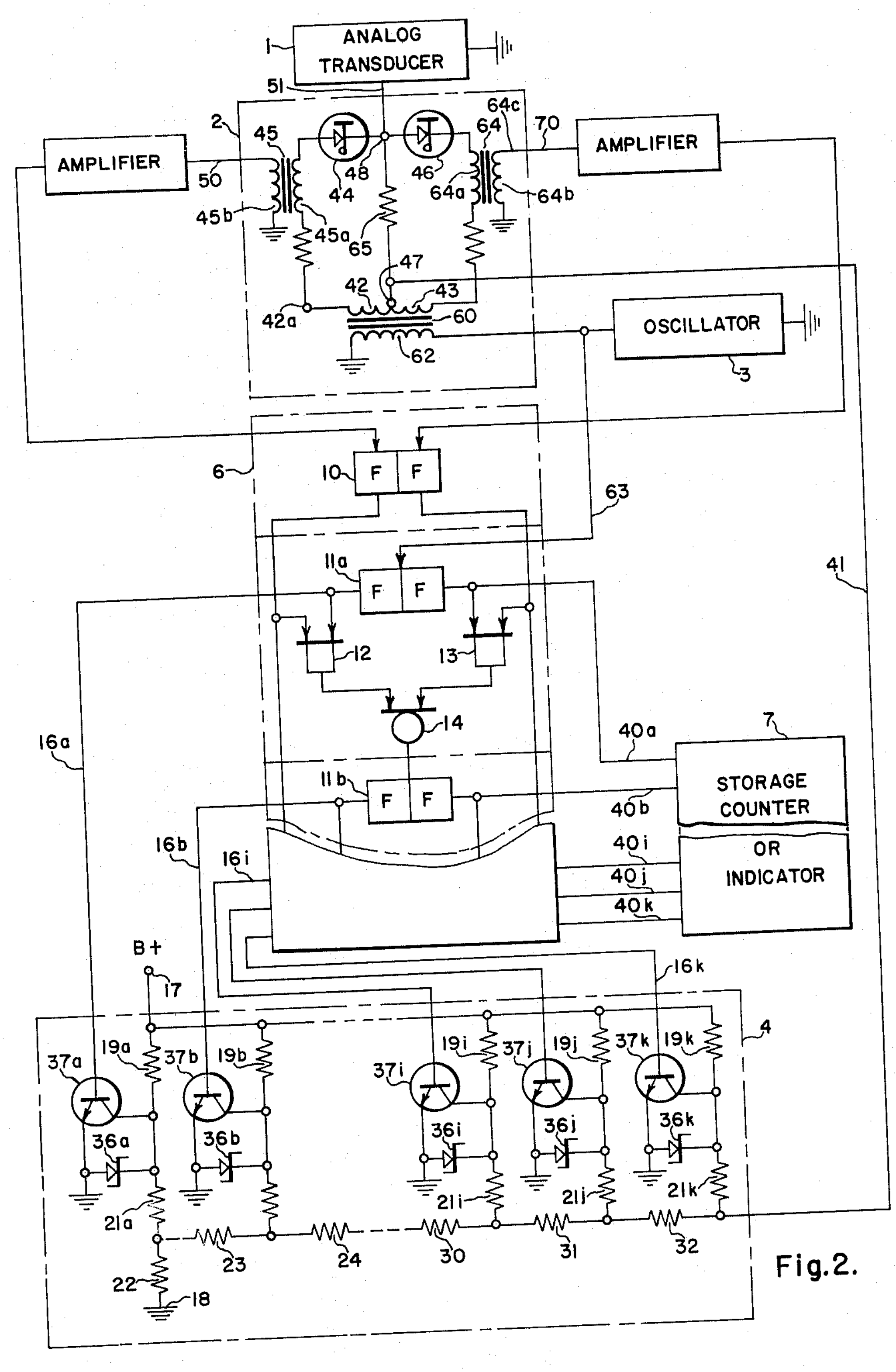
FIG. 2 is a circuit diagram, partially in block form and partially in detailed form, to show the essential features of the circuit in accordance with the present invention.

Referring to FIG. 2, it can be seen that the forward-backward counter 6 is fundamentally a binary digital register having a conventional multivibrator or flip-flop unit 10 of the type in which the output alternates between the zero and 1 state in response to two separate inputs and a plurality of steering flip-flop units which similarly alternates between states in response to a single input, designated 11, with appropriate subscripts, corresponding to the stages of the digital to analogue converter 4. The first counter unit or stage 10 is energized from the comparator 2. The output of the first counter stage 10 is steered, in conjunction with clock timing pulses from oscillator 3, to cause the counter 6 to count forward or backward. To this end, the two outputs of the flip-flop 10 are each connected to a series of AND circuits 12, 13. The other side of the respective AND circuits 12 and 13 are connected to the respective outputs of the second and subsequent flip-flops 11*a*, 11*b*, etc. The respective outputs of the AND circuits 12 and 13 are connected to the inputs of respective OR circuits 14. In conventional manner the output of the first OR circuit 14 is connected to the input of the second steering flip-flop 11*b*, and so on, throughout the counter. The AND circuits 12 and 13 constitute steering gates in a manner which will be further described in connection with the operation of the system.

One side of the outputs of each steering flip-flop is connected, respectively, to the resistor electrical summation network of the digital-to-analog converter 4 in such a manner as to provide a converter output which can be varied progressively geometrically by a ratio of two from the least to the most significant digit.

To this end, the left-hand output of the flip-flop 11*a* is connected by the connection 16*a* to the resistor 19*a* of the electrical summation network of the digital-to-analog converter 4. The resistor 19*a* represents the digit of least significance. The electrical summation network of digital-to-analog converter 4 constitutes a resistor ladder attenuator comprising a series of potential dividers between a source of potential 17 and ground 18. This summation network may be of a type known in the prior art, such as described in Notes on Analog-Digital Conversion Techniques, published by Technology Press Department of Electrical Engineering, M.I.T., edited by Alfred K. Susskind, chapter 5, pages 30 to 33. The potential divider for the first counter stage comprises resistors 19*a* and 21*a* and this is representative of similar potential dividers for the other nine stages of the counter 6. The potential dividers for the respective stages constitute components of the summation network which includes resistor 22 and resistors 23 to 32, inclusive.

The accuracy of the system of the present invention is predominantly dependent upon this ladder attenuator network. The elements of the attenuator ladder, that is, the potential dividers for the individual stages, are selectively set at a reference voltage by means of Zener diodes 36*a* to 36*k*, respectively, for the respective stages of the counter 6. These Zener diodes act as the reference power sources for the resistors of the network. These diodes will be matched to a very small tolerance and will be subsequently trimmed by the associated resistors 19*a* through 19*k*, respectively, to obtain the necessary accuracy. These diodes will be operated in the region of zero temperature coefficient or, at approximately, 5 volts.

From an inspection of the ladder attenuator network it is to be noted that the greatest requirement for accuracy is placed upon the diode 36*k* which is in the voltage divider circuit for the most significant digit. As an example for .01% accuracy of the system the diode 36*k* must be set to within 0.05% of the established reference potential. The tolerances of the other respective diodes may be progressively larger while still retaining the overall accuracy. For example, the diode 36*j* should be set to 0.1% accuracy while the diode 36*i* could be set to 0.2% accuracy, and so forth. The degree of accuracy of the setting is proportional to the significance of the digit which they represent.

The transistors 37*a* through 37*k*, respectively, act as the switches for shorting out portions of the potential dividers in the respective stages of the counter 6. These transistors are selectively placed in one of two alternate states depending upon the states of the respective outputs of the flip-flops of the counter 6. As an example, a 1 state signal from flip-flop 11*a* on connection 16*a* would put the transistor 37*a* in the full conducting state. This would ground the reference diode 36*a* and hold the summing network resistor 21*a* at zero potential. On the other hand, when the potential on the connection 16*a* represents a zero state the diode 37*a* would be cutoff, therefore acting as a high impedance and allowing the full reference potential at the lower end of resistor 19*a*, which is the same as the potential on the anode of the Zener diode 36*a*, to be applied to the resistor 21*a* of the summation ladder network. Preferably, the transistors 37*a* through 37*k* are of the type that develop a very small potential between collector and emitter when conducting the full current.

From the above description it will be apparent that while the steering flip-flop stages of the counter 6 have one side of their respective outputs applied to the ladder network of the converter 4, as illustrated in FIG. 2, to develop an analog representation of the unknown output of transducer 1, the other sides of the outputs of the respective stages may represent the binary digital representation in the forward-backward counter 6. These outputs may be supplied over connections 40*a* to 40*k*, respectively, to the storage register 7.

Referring back to FIGURE 1, it will be recalled that the binary digital reference voltage output from ladder attenuator network of the converter 4 is compared in the voltage comparator 2 with the output of the transducer 1.

Figure 3:
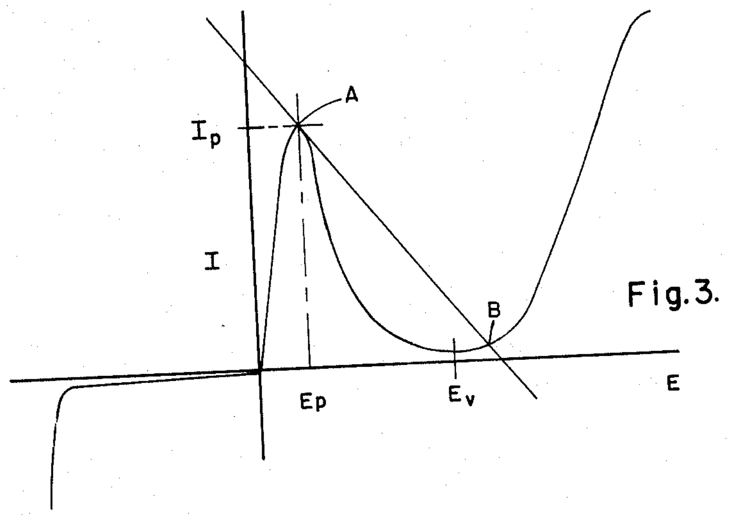
FIG. 3 is a graphical representation of the operating characteristics of special diodes used in the voltage comparator.
Figure 4:
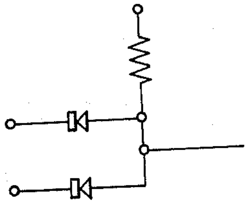
FIG. 4 illustrates the type of AND gate used in the present system.
Figure 5:
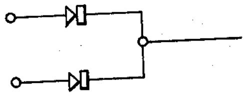
FIG. 5 illustrates the type of OR gate used in the present system.

An essential feature of the present invention is the bridge modulator voltage comparator circuit constituting the comparator 2 shown in the upper part of FIG. 2. This bridge circuit includes two parallel branches, one of which includes a special diode 44, the primary winding 45*a* of a transformer 45 and an inductance 42, which is one-half of the secondary of a transformer 60, having a pirmary winding 62 through which clock pulses are supplied to the comparator 2. The other branch includes a special diode 46, the primary 64*a* of a transformer 64 and an inductance 43, which is the other half of the secondary of transformer 60. Since the two legs, or branches, of the comparator circuit include unilaterally conducting diodes 44 and 46, respectively, a suitable dropping resistor 65 is connected between the center point 47 between the inductances 42 and 43 and the junction point 48 between the diodes 44 and 46. This may be considered as a third branch between the two end terminals of the bridge. This is not a conventional Wheatstone bridge and since the other two branches have unilateral devices this third branch is provided to complete a circuit for selectively and independently providing an output signal from each of the other two branches. Since the diodes are connected in series to conduct in the same direction across the secondary of the transformer 60, that is, the inductances 42 and 43, in the absence of a biasing voltage across the resistor 65 both diodes will conduct in the same direction during each half cycle when the point 42*a* on the secondary of the transformer 60 is positive. Under conditions when point 48 is negative with respect to point 47, diode 46 will be back biased and it will not conduct. Preferably the special diodes 44 and 46 have operating characteristics, as illustrated in FIG. 3 and are of the type described and claimed in United States Patent 3,018,423, issued to Melvin W. Aarons, John W. Dzimianski and John M. Bentley, and assigned to the assignee of the present invention. The diodes 44 and 46, or a combination of components providing the characteristics defined in said patent and illustrated in FIG. 3 of this application, when associated in the circuit of comparator 2 as taught by this invention greatly contributes to the sensitivity and high gain of the present system.

The secondary $45b$ of the transformer 45 is connected to the input of one section of the flip-flop 10 and the secondary $64b$ of transformer 64 is connected to the input of the other section of flip-flop 10. The comparator 2 is actively energized by the clock pulse oscillator 3 through the transformer 60. The selective output of the comparator 2 energizes the two sections of the first flip-flop stage 10 in accordance with the sense of the potential difference between points 47 and 48 and the outputs of the latter stage in conjunction with the energization of the first steering flip-flop stage 11*a* directly from the oscillator 3, steers the counter 6 to count up or down, as more fully explained hereinafter.

The circuit of comparator 2 provides the necessary high impedance both to the unknown analog input voltage from transducer 1 on the connection 51, as well as the binary digital reference voltage from the digital-to-analog converter 4 on connection 41 and measures the direction of current flow through the resistor 65 between the center tap 47 between the two inductances 42 and 43 and the junction 48 between the two diodes 44 and 46. The binary digital reference potential from the output of the digital-to-analog converter 4 on connection 41 is of the same polarity with respect to ground as the analog input voltage on the connection 51 from the analog transducer 1. By means of the computer logic circuitry of the forward-backward counter 6 and the digital-to-analog converter 4 the reference potential on the connection 41 is varied until it equals the sampled unknown analog input voltage on connection 51 to within the least significant bit value. At null, the only current that flows is a result of this small potential divided by all the associated series resistances of the analog transducer 1 and the ladder attenuator summation network of converter 4. This current is so small that it cannot degrade the conversion regardless of the value of the transducer resistance so long as the comparator 2 is sufficiently sensitive to detect it.

Suitable clock pulses are applied to the bridge modulator circuit of comparator 2 from the generator or oscillator 3. The frequency of this oscillator may be substantially any value within the operating limits of the diodes 44 and 46 and the associated components. These clock pulses are supplied to the bridge modulator circuit of comparator 2 through the transformer 60 having a primary winding 62 inductively coupled to the inductances 42 and 43 constituting the secondary of the transformer, as previously mentioned. The oscillator 3 also supplies clock pulses to the forward-backward counter 6 through the connection 63 and these pulses in conjunction with the outputs from the flip-flop 10 steer the direction of operation of counter 6.

The significance of the special diodes 44 and 46, sometimes referred to as "tunard" diodes, will be appreciated in connection with an analysis of the operation of the system. FIG. 3 illustrates the manner in which the characteristics of these diodes give to the voltage comparator circuit 2 very high sensitivity and also provide a voltage gain as a result of the comparison process.

The operation of the comparator circuit is dependent upon the matching of the diodes 44 and 46 for voltage and current from zero to a point A, on the curve of FIG. 3, which corresponds to the voltage $E_P$ to within the necessary resolution. If the current is adjusted so that the effective load line for each diode intersects its characteristic at a point very slightly below the value $E_P$ and if the value of input pulse is adjusted so that its value is just sufficient to swing each diode from the point zero to slightly less than $E_P$ when there is no difference between the unknown analog input voltage on connection 51 and the binary digit reference voltage on connection 41 from the digital-analog-converter 4, then there will be no output obtained from either of transformers 45 or 64 of the two respective branches of the comparator circuit. With a difference voltage between the connections 51 and 41, one of the diodes 44 or 46 will be forward biased and the other will be back biased. Then when a pulse is applied through transformer 60 from the oscillator 3 the diode that is forward biased will be forced beyond the point $E_P$ and will swing through the negative resistance region at a very fast rate. When the pulse diminishes below the valley potential $E_V$ the operating point of that diode will return rapidly to $E_P$ and then pass on through zero into the negative voltage region at the left-hand side of FIG. 3. It is this rapid excursion of the voltage and current that is detected as the output information, the gain being a function of this rapid swing into the negative voltage region. This will cause the voltage pulse in one or the other of the branches to be coupled from the voltage comparator circuit 2 through either of the transformers 45 or 64 and be supplied to one of the inputs of flip-flop 10 of the counter 6. The gain of the comparator circuit, by reason of the special characteristics of the diodes 42 and 46, is very high thereby making the system very sensitive, accurate and providing a high signal to noise ratio.

In the operation of the present invention it will be assumed for illustrative purposes that the signal on connection 51, representing the unknown analog to be sampled, is a varying D.C. voltage. It will be assumed that at the instant of operation under consideration the unknown analog voltage is beginning to increase. Therefore, the voltage on connection 51 will be slightly higher than the voltage on connection 41. It has been previously indicated that the voltages on both connections 51 and 41 are positive with respect to ground and therefore if the voltage on 51 is higher it will be positive with respect to the voltage on connection 41. Accordingly, the anode of diode 46 will be positive with respect to its cathode while the other diode 44 will be back biased. Now assuming that the poling of the transformer 60 is such as to give a positive pulse at point 42*a* of winding 42 in response to pulses from oscillator 3, then when a pulse is supplied from the oscillator 3 to diode 46, being forward biased, will be forced beyond its peak voltage $E_P$ and will swing through its negative resistance region at a very fast rate. This will provide a positive pulse from transformer 64 to the left-hand section of flip-flop 10 which will cause the counter 6 to count up, thus increasing the binary digital reference voltage on connection 41 by one digit. As soon as the reference voltage on connection 41 reaches a value equal to the voltage on the connection 51, within the resolution accuracy of the system, the two arms of the comparator bridge circuit of the voltage comparator 2 will be balanced and there will be no output from either transformer 45 or 64 to either section of the flip-flop 10 thereby causing the counter 6 to stop counting. On the other hand, if the voltage on connection 51 starts to decrease, this potential will become negative with respect to the reference potential on connection 41, thereby causing diode 44 to conduct and pulses will be supplied from transformer 45 to the opposite section of counter stage 10. The outputs of the counter stage 10 are supplied to AND gates 12 and 13, to which are also supplied the outputs of counter stage 11*a* which is triggered directly over connection 63 by the oscillator 3. It is the coincident action of the triggering of stage 11*a* by the clock pulses and the respective outputs of stage 10 that determines whether the counter 6 counts up or down to follow the changes in the unknown analog input voltage on connection 51. It should be stated here that the transformer 64 is so poled that when diode 46 conducts a positive pulse will be supplied at point 64*c* on the secondary 64*b*.

Any amplifiers inserted in the connections 50 or 70 from transformers 45 and 64, respectively, will be so constructed as to deliver positive output pulses to the respective sections of counter stage 10.

Thus, it will be seen that the present invention provides a novel and improved analog-to-digital conversion system which is simple, very accurate and has very high gain. The improved comparator circuit utilizing the special tunard diodes or components having equivalent characteristics shown in FIG. 3 is extremely sensitive to small variations in the unknown analog input voltage on connection 51 and will be capable of operating at a very high speed.

While the invention has been shown in but one form, it will be obvious to those skilled in the art that it is not so limited, but is susceptible of various changes and modifications without departing from the spirit of the invention.

I claim as my invention:

1. An analog-to-digtal converter comprising, a comparator circuit having a pair of output means; means for applying input analog signals to said comparator circuit; a multivibrator of the type in which the output alternates between zero and the 1 state in response to two separate inputs; a signal responsive counter having a plurality of bistable counting stages of the type in which the states are changed in response to all pulses of the same selected polarity, a digital-to-analog electrical summation network adapted to be energized in response to the output from one side of each of said stages of said counter to provide a binary digital analog representation of the digits stored in said counter; means for supplying the binary digital reference voltage output from said summation network to said comparator circuit; means for supplying the outputs from said comparator circuit to said multivibrator; means for supplying timing pulses to said comparator circuit and to the first of said plurality of counting stages; said comparator circuit being responsive to the instantaneous difference in amplitude and polarity between said input analog and the binary digital reference output voltages of said summation network for supplying control pulses alternately to opposite sides of said multivibrator.

2. An analog-to-digital converter comprising, a comparator circuit having a pair of output means; means for applying input analog signals to said comparator circuit; a multivibrator of the type in which the output alternates between zero and the 1 state in response to two separate inputs; a signal responsive counter having a plurality of counter stages of the type in which the states are changed in response to all pulses of the same selected polarity, each providing simultaneously outputs, a digital-to-analog electrical summation network adapted to be energized in response to the output from one side of each of said stages of said counter to provide an analog representation of the digits stored in said counter; means for supplying the binary digital reference voltage output from said summation network to said comparator circuit; means for supplying the outputs from said comparator circuit to said multivibrator; means for supplying timing pulses to said comparator circuit and to the first of said plurality of counter stages; said comparator circuit being responsive to the instantaneous difference in amplitude and polarity between said input analog and the binary digital reference output voltage of said summation network for supplying control pulses alternately to the opposite sides of said multivibrator; steering AND gates operatively connected between said counter stages and energized by the respective outputs of said multivibrator and said counter stages, whereby when the output pulses supplied from said multivibrator and said first counter stage are coincident in time in one of said AND gates said counter will count forward and when the output pulses from said multivibrator and said first counter stage are in time coincidence in the other of said AND gates between the first and second counter stages said counter will count backward.

3. An analog-to-digital converter responsive to applied counting pulses for continuously converting the instantaneous amplitude of a variable input signal into digital form, said converter comprising, an electronic digital counting circuit operable to count up or count down in response to control pulses; and electrical summation network electrically coupled to said counting circuit for continuously converting the digital count in said counting circuit to an analog signal of amplitude equivalent to the digital count; one side of said counter also providing a source of digital output signals; comparator means electrically coupled to the output of said network for comparing said electrical analog signal with the variable electrical signal to provide two sets of signals each having two levels, said comparator circuit comprising a bridge circuit having two branches each including a portion of a source of timing pulses divided equally between said branches and including non-linear resistance devices having similar non-linear resistance characteristics in both directions, said devices having positive and negative regions in one direction with a current peak point between and being connected in series with the same characteristic in the same direction across said source; a third branch including a potential dropping impedance connected between the junction of said resistance devices and the center of said source, whereby the sense of difference of the compared voltages in one direction will cause one of said resistance devices to conduct while the sense of voltage difference in the opposite direction will cause the other of said resistance devices to conduct, the conduction of said resistance devices providing control pulses for determining the direction of counting of said counter.

4. The combination as set forth in claim 3 in which said non-linear resistance devices have current-voltage characteristic having a positive and a negative region separated by a peak current point for a selected forward voltage and having a reverse breakdown voltage level of larger magnitude than said forward peak current voltage.

5. An analog-to-digital converter responsive to applied counting pulses for simultaneously converting the instantaneous amplitude of a variable input signal into digital form, said converter comprising, an electronic digital counting circuit operable to count up or count down in response to control pulses; an electrical summation network electrically coupled to said counting circuit for continuously converting the digital count in said counting circuit to an analog signal of amplitude equivalent to the digital count; one side of said counter also providing a source of digital output signals; comparator means electrically coupled to the output of said network for comparing said electrical analog signal with the variable electrical signal to provide two sets of signals each having two levels, said comparator circuit comprising a bridge circuit having three parallel branches, two of said branches including a center-tapped impedance coupled to said source of timing pulses and including non-linear resistance devices having similar non-linear resistance charatceristics in both directions, said devices each having a positive and a negative region in one direction with a current peak point betwen the positive and negative region, said devices being connected in series with the same characteristics in the same direction across said impedance; the third branch including a potential dropping impedance connected between the junction of said resistance devices and the center tap of said impedance, whereby the sense of the difference of the compared voltages in one direction will cause one of said resistance devices to conduct while the sense of the voltage difference in the opposite direction will cause the other of said resistance devices to conduct, output means associated with each respective resistance device for selectively generating control pulses in response to the selective condition of said devices.

6. An analog-to-digital converter comprising a comparator circuit having a pair of output means; means for applying input analog signals to said comparator circuit; a multivibrator of the type in which the output alternates between zero and the 1 state in response to two separate inputs; a signal responsive counter having a plurality of bistable counting stages of the type in which the states are changed in response to all pulses of the same selected polarity, a digital-to-analog electrical summation network adapted to be energized in response to the output from one side of each of said stages of said counter to provide a binary digital analog representation of the digits stored in said counter; means for supplying the binary digital reference voltage output from said summation network to said comparator circuit; means for applying sequential sampling pulses for energizing said devices in their forward direction to a level less than the peak current forward voltage, means for summing the difference voltage between the unknown and the reference voltage with said sampling pulses wereby when said voltage difference is combined with said sampling pulses one of said devices will be driven beyond its peak current point and generate an output control pulse; means for also supplying said timing pulses to the first of said plurality of counter stages; means for applying the output from said comparator to the opposite sides of said multivibrator; a pair of AND gates and an OR gate operatively connected between each counter stage, each of said AND gates being connected to respective outputs from said multivibrator and to respective outputs from its associated counter stage whereby said AND gates are jointly responsive to the outputs of said multivibrator and the associated counter stage, the output of the respective pairs of AND gates betwen the counter stages being supplied to the associated OR gate whereby the conjoint action of the outputs of said multivibrator and the outputs of the said stages controls the direction of counting of said counter.

References Cited by the Examiner

UNITED STATES PATENTS

| | | | |
|---|---|---|---|
| 2,836,356 | 5/1958 | Forrest et al. | 340—347 |
| 2,989,741 | 6/1961 | Gordon et al. | 340—347 |
| 2,991,372 | 7/1961 | Blocher | 307—88.5 |
| 3,098,162 | 7/1963 | Fichman et al. | 307—88.5 |

DARYL W. COOK, *Acting Primary Examiner.*

MALCOLM A. MORRISON, *Examiner.*

K. R. STEVENS, *Assistant Examiner.*